(12) United States Patent
Ellis et al.

(10) Patent No.: US 8,429,296 B2
(45) Date of Patent: Apr. 23, 2013

(54) METHOD AND APPARATUS FOR DISTRIBUTING ROUTING INSTRUCTIONS OVER MULTIPLE INTERFACES OF A DATA ROUTER

(75) Inventors: Steven Clay Ellis, Los Gatos, CA (US); Deepak Kharbanda, San Jose, CA (US); Xiaoyan Chang, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 1703 days.

(21) Appl. No.: 10/104,904

(22) Filed: Mar. 21, 2002

(65) Prior Publication Data

US 2002/0126671 A1    Sep. 12, 2002

Related U.S. Application Data

(63) Continuation-in-part of application No. 09/854,234, filed on May 10, 2001, now Pat. No. 6,870,844, which is a continuation-in-part of application No. 09/800,678, filed on Mar. 6, 2001, now Pat. No. 6,831,891.

(51) Int. Cl.
*G06F 15/16* (2006.01)

(52) U.S. Cl.
USPC .................................................. 709/243

(58) Field of Classification Search ............... 709/200, 709/223, 238, 243, 245, 250; 370/229, 230, 370/351, 389, 390
See application file for complete search history.

(56) References Cited

U.S. PATENT DOCUMENTS

| | | | | |
|---|---|---|---|---|
| 6,157,644 A | * | 12/2000 | Bernstein et al. | 370/392 |
| 6,483,832 B1 | * | 11/2002 | Civanlar et al. | 370/390 |
| 6,894,990 B1 | * | 5/2005 | Agarwal et al. | 370/321 |
| 6,947,963 B1 | * | 9/2005 | Agarwal et al. | 709/201 |
| 6,990,103 B1 | * | 1/2006 | Gollamudi | 370/395.31 |
| 2002/0021697 A1 | | 2/2002 | Tsuchiya et al. | |
| 2003/0018715 A1 | * | 1/2003 | O'Neill | 709/204 |
| 2003/0043804 A1 | | 3/2003 | Kumar et al. | |

FOREIGN PATENT DOCUMENTS

| | | | |
|---|---|---|---|
| EP | 0 993 153 | * | 12/2000 |
| WO | WO 0201413 A | | 1/2002 |

OTHER PUBLICATIONS

U.S. Appl. No. 09/854,234, Russell Tuck, III et al.
U.S. Appl. No. 09/800,678, Deepak Mansharamani et al.
Aweya J, IP Router Architectures: An Overview, International Journal of Communication Systems, Jun. 2001, pp. 447-475, vol. 14, No. 5, XP008017416, Wiley, Chichester, GB.
Gerd Besch, Analysis and Engineering of the Infrastructure Required to Support Multicast Traffic at an Internet Exchange Point, Feb. 15, 2002, XP007900243, Online Internet URL:http://besch.gmxhorne.de/download/gen/thesis-gerd-besch-screen.pd.

* cited by examiner

*Primary Examiner* — Scott Christensen
(74) *Attorney, Agent, or Firm* — Donald R. Boys; Central Coast Patent Agency, Inc.

(57) ABSTRACT

A software application in a multi-processor data router in which a forwarding information base for the router is maintained is provided with a server module and one or more client modules, each client module associated with one or more communication interfaces of the data router. The application is characterized in that the server module sends to each client module only that portion of the forwarding information base specific to the communication interfaces associated with the client module.

30 Claims, 12 Drawing Sheets

Multi-Cast Port (ASIC)

METHOD AND APPARATUS FOR DISTRIBUTING ROUTING INSTRUCTIONS OVER MULTIPLE INTERFACES OF A DATA ROUTER

CROSS-REFERENCE TO RELATED DOCUMENTS

The present invention is a continuation in part (CIP) to a U.S. patent application Ser. No. 09/854,234 entitled "Apparatus and Methods for Efficient Multicasting of Data Packets" filed on May 10, 2001 now U.S. Pat. No. 6,870,844, which is a CIP to a U.S. patent application Ser. No. 09/800,678, entitled "An Improved System for Fabric Packet Control", filed Mar. 6, 2001 now U.S. Pat. No. 6,831,891, which documents are incorporated herein in their entirety by reference.

FIELD OF THE INVENTION

The present invention is in the field of data routing of multicast data packets over a data packet network, and pertains more particularly to assigning and distributing portions of a routing table to router line interfaces, the assigned portions pertinent to the data expected to arrive at the interface for forwarding.

BACKGROUND OF THE INVENTION

With the advent of the well-known Internet network and similar data-packet-networks, much attention in the art has been devoted to improvement of packet routing technologies developed for routing data packets from source nodes to destination nodes, usually through multiple intermediary nodes or hops in a given network topology, between the source and destination locations. One of the most prevalent contributions to the art involves design and development of more efficient data routers. A state-of-the-art router known to the inventor makes use of a distributive architecture, having multiple processors, enabling high scalability with respect to adding data routing capacity.

The router described above is known to the inventor as a Terabit Network Router (TNR), and has multiple line interfaces each having multiple ports for accepting data into the router and forwarding data out of the router. The TNR also has a fabric of interconnected processor nodes termed fabric cards for routing data through the router from line ingress to line egress. Multiple control processors in the TNR provide needed messaging functions, configuration and protocol distribution, as well as special packet processing, among other functions.

Making efficient use of bandwidth is an ever-present challenge to manufacturers of data routers. Eliminating unnecessary messaging between routers and reducing internal messaging and notification with respect to data packet processing is always a desirable goal in this respect.

A method known to the inventor and used in a distributed processor router enables data management to be efficiently accomplished in a fabric network of the router without requiring conventional flow control, which typically requires upstream propagation of flow control messages. The method known to the inventor provides for lower loss of data packets, and is less complex in operation than conventional flow-control methods.

The known method involves establishing a virtual output queue (VOQ) and a queue manager at each incoming port path of each interconnected processor node or fabric card making up the fabric of the router. With respect to these nodes, each one has at least two, but typically more, external ports, and the individual ports of each node are coupled internally by a switching mechanism, termed a crossbar, to other ports of the node. The VOQ and queue manager provide management for data arriving at each port. In this data-routing system, all data is passed from an ingress port of the fabric card to an egress port of the fabric card as long as a queue in the path established between the ports is less than full. Ingress packets are discarded in a port path having a full queue until the queue level is again less than full. The system frees up processor resources from upstream flow-control responsibility thereby reserving processor resources for other, more important data routing and management functions.

Another area where more bandwidth management efficiency is desired is in the area of Internet Protocol (IP) multicasting. IP Multicasting protocols, in general, work to reduce network traffic congestion by enabling delivery of a single data stream to multiple recipients, usually subscribers of the original stream. Applications that take advantage of IP multicast technologies include video conferencing, IP telephony, educational interaction, file sharing, and the like.

IP multicast technology is based on a group concept. For example, a group of network-connected nodes subscribes to a particular data stream. These nodes can be located anywhere on the connected network, and have no particular geographic limitations. Nodes that wish to receive data destined to a particular group of end nodes use a protocol termed Internet Group Management Protocol (IGMP). Such host nodes must be a group member of the Protocol in order to receive the stream.

In current art, multicast data packets are replicated at routers, often using a well-known protocol termed in the art Protocol Independent Multicast (PIM). PIM can leverage prevalent network routing protocols to more efficiently route multicast data packets through a network. One of the more challenging tasks in IP multicasting is the function of replicating the data packets for the multiple end destinations.

There are, in broad terms, two categories of PIM. In one category, termed Sparse mode (PIM SM), recipients are required to subscribe to the source; so in PIM SM the multicast streams are limited to the subscribers. There is also a Dense Mode (PIM DM), wherein packets from a source are sent to all reasonable destinations and those who do not want or need the packets simply drop the multicast packets. Clearly the DM mode results in a greater proliferation of data packets than the sparse mode, therefore the name.

One liability inherent to prior and current art multicast methods as practiced on a data-packet-network is that routers that are enhanced for IP multicasting are typically not scalable in amount of multicast traffic they can handle, including the number of individual copies made of each multicast packet. Such routers are also limited in the number of router ports available for forwarding multicast data.

An enhancement in IP multicast capability known to the inventor and utilized in distributed processor routers such as the TNR described above involves provision of a multicast engine for replicating packets incoming to the router and identified as multicast packets. The multicast engine is distributed to assigned multicasting ports of fabric nodes or cards making up the internal routing fabric. The multicast engine at each assigned node uses a table that provides sets of instructions unique to each assigned port for completing its portion of a multicast assignment with regard to numbers of copies made and internal addressing requirements. In this way, multicast forwarding is distributed in a fan-out fashion through a network such that no concentrated use of network resources occurs, possibly creating overloads or bottlenecks.

As described above, IP multicast addresses specify an arbitrary group (G) of IP hosts that have joined the group and wish to receive traffic sent to this group. In more granular implementation of PIM, such hosts may also requests packets for G that originated from a particular source (S). However, when these downstream hosts receive and identify the multicast data at their ingress (upstream ports) a unicast, and in some cases a multicast routing table must be consulted in order to properly forward the packets to their next-hop or final destinations according to the G metrics. Therefore, valuable processor resources operating in the hosts are diverted from normal unicast processing in order to accomplish the multicast forwarding requirements. Scanning an entire table for instructions for processing every multicast data packet arriving at ingress of the router is particularly burdensome for a distributed processor router having a large number of ingress ports receiving data. It has occurred to the inventor that an IP host, whether of the form of a distributed processor router or even a single processor router, could be made more efficient in terms of resource conservation if extensive table lookups for forwarding instructions could be avoided.

Therefore, what is clearly needed is a mechanism for distributing just a portion of the larger body of IP multicast forwarding data to upstream line interfaces of a router that are expected to receive the multicast data that the distributed portion applies to. A mechanism such as this would eliminate normally extensive data lookup processes that tax processing resources of a router engaged in IP multicast data forwarding.

SUMMARY OF THE INVENTION

In a preferred embodiment of the present invention a software application in a multi-processor data router in which a forwarding information base for the router is maintained is provided, comprising a server module, and one or more client modules, each client module associated with one or more communication interfaces of the data router. The application is characterized in that the server module sends to each client module only that portion of the forwarding information base specific to the communication interfaces associated with the client module.

In a preferred embodiment there is one server module and multiple client modules. Also in a preferred embodiment the operating protocol followed is protocol independent multicast (PIM). Further, an assigned number of physical port interfaces on a line processor may share a single block of forwarding information. Still further, the portions of multicast forwarding information may be periodically updated at their client modules by the server module. Further yet, the router may be connected to and operates on the Internet network.

In a preferred embodiment more than one portion of multicast forwarding information blocks distributed to a single client module are stored in a single forwarding table locally at the line processor, and individual ones of the physical interfaces access their assigned forwarding instructions from the local table according to need.

Still in a preferred embodiment there may further a mechanism for asserting a drop state for unexpected multicast data packets arriving at any physical interface of an enabled line processor. There may also be a mechanism for creating forwarding state for unexpected multicast packets arriving at any of the physical interfaces of an enabled line processor.

IN another preferred embodiment, operating in protocol-independent multicasting sparse mode (PIM-SM), a processor of the data router may send a request to a neighboring router to join a group, retrieving group and source information, and the server module then prepares and sends to an appropriate client module that portion of the forwarding information base associated with packets expected to be received at the associated communication interfaces as a result of joining the group.

In still another preferred embodiment the software application, operating in protocol-independent multicasting dense mode (PIM-DM), each time an unexpected multicast packet is received at a communication interface associated with a client module, the client module communicates information about the packet to the server module, which identifies a portion of the forwarding information base pertinent to the packet, and then forwards that portion of the forwarding information base to the client module.

IN another aspect of the invention a method for processing multicast data packets in a multiple-processor data router is provided, comprising steps of (a) sending a request to an upstream router to join a multicast group, the request including an ingress interface for receiving the requested multicast data packets; (b) isolating and distributing a portion of a multicast forwarding information base to a client software module associated with the ingress interface expecting to receive the multicast data packets; (c) receiving the requested multicast data packets at the ingress interface; and (d) using the forwarded portion of the information base to process the received multicast data packets.

In one embodiment of the method, in step (a), the metrics include one or more of network layer address information, circuit ID metrics, and physical port metrics. In another embodiment, in step (b), the multicast forwarding information follows protocol independent multicast (PIM), and distribution may be from a PIM server to one or more PIM clients.

In yet another aspect of the invention a method for processing multicast data packets in a multiple-processor data router is provided, comprising steps of (a) receiving a first multicast data packet of a data flow for forwarding at a line interface of the router; (b) initiating and sending a request to a control processor of the router, the request containing source and group information for the received data packet and requesting forwarding information; (c) receiving the request at the control processor and consulting with a main routing table to build a forwarding information applicable to the data packet; (d) distributing the appropriate forwarding information to the requesting line interface; and (e) applying, at the line interface, the distributed information to forward the multicast data packet and subsequent data packets of the same flow.

In some cases, in step (b), the request is sent by a PIM client application to a PIM server application. Also in some cases, in step (d), the distributed forwarding information is stored in a local table at the line processor. The local the local table may be updated periodically with new forwarding information.

In yet another aspect of the invention a multicast-enabled data router is provided, comprising a plurality of processors, individual ones operating as clients and associated with specific ones of multiple communication interfaces, and one functioning as a control processor having access to a forwarding information base, and a software application comprising a server module executing on the control processor, and one or more client modules executing on individual ones of the processors associated with specific communication interfaces. The router is characterized in that the server module sends to each client module only that portion of the forwarding information base specific to the communication interfaces associated with the client modules.

In a preferred embodiment of the router, the operating protocol followed is protocol independent multicast (PIM). In this and other embodiments the portions of multicast forwarding information may be periodically updated at their client modules by the server module. The network can be the well-known Internet network. There may further be a mechanism for asserting a drop state for unexpected multicast data packets arriving at any interface, and a mechanism for creating a forwarding state for unexpected multicast packets arriving at any physical interfaces associated with a client module.

In some cases the data router operates in protocol-independent multicasting sparse mode (PIM-SM), wherein a processor of the data router sends a request to a neighboring router to join a group, retrieving group and source information, and the server module then prepares and sends to an appropriate client module that portion of the forwarding information base associated with packets expected to be received at the associated communication interfaces as a result of joining the group.

In another embodiment, operating in protocol-independent multicasting dense mode (PIM-DM), each time an unexpected multicast packet is received at a communication interface associated with a client module, the client module communicates information about the packet to the server module, which identifies a portion of the forwarding information base pertinent to the packet, and then forwards that portion of the forwarding information base to the client module.

In yet another aspect a method for processing multicast packets is provided, comprising the steps of (a) sending, by a server module to a client module, the server module executing on a control processor and the client module executing on a processor associated with an individual communication interface, a portion of a forwarding information base pertinent the communication interface; and (b) using, by the client module, the portion of the forwarding information base sent by the server module to process multicast packets received at the communication interface without requesting information from the original forwarding information base.

In some cases of this there is one server module and multiple client modules. Further, the operating protocol followed may be protocol independent multicast (PIM). Also further, the portions of multicast forwarding information are periodically updated at their client modules by the server module. Also, the method may be performed in a router connected to and operating on the Internet network. Still further, there may be included a mechanism for asserting a drop state for unexpected multicast data packets arriving at any enabled interface. Also, there may be included a mechanism for creating forwarding state for unexpected multicast packets arriving at any of the physical interfaces of an enabled line processor.

In another preferred embodiment the method may operate in protocol-independent multicasting sparse mode (PIM-SM), wherein a processor of the data router sends a request to a neighboring router to join a group, retrieving group and source information, and the server module then prepares and sends to an appropriate client module that portion of the forwarding information base associated with packets expected to be received at the associated communication interfaces as a result of joining the group.

In yet another preferred embodiment the method operates in a protocol-independent multicasting dense mode (PIM-DM), wherein, each time an unexpected multicast packet is received at a communication interface associated with a client module, the client module communicates information about the packet to the server module, which identifies a portion of the forwarding information base pertinent to the packet, and then forwards that portion of the forwarding information base to the client module.

In embodiments of the invention described in enabling detail below, for the first time a software application is made available that sends to each client module only that portion of the forwarding information base specific to the communication interfaces associated with the client module.

BRIEF DESCRIPTION OF THE DRAWING FIGURES

DESCRIPTION OF THE PREFERRED EMBODIMENTS

Figure 1:
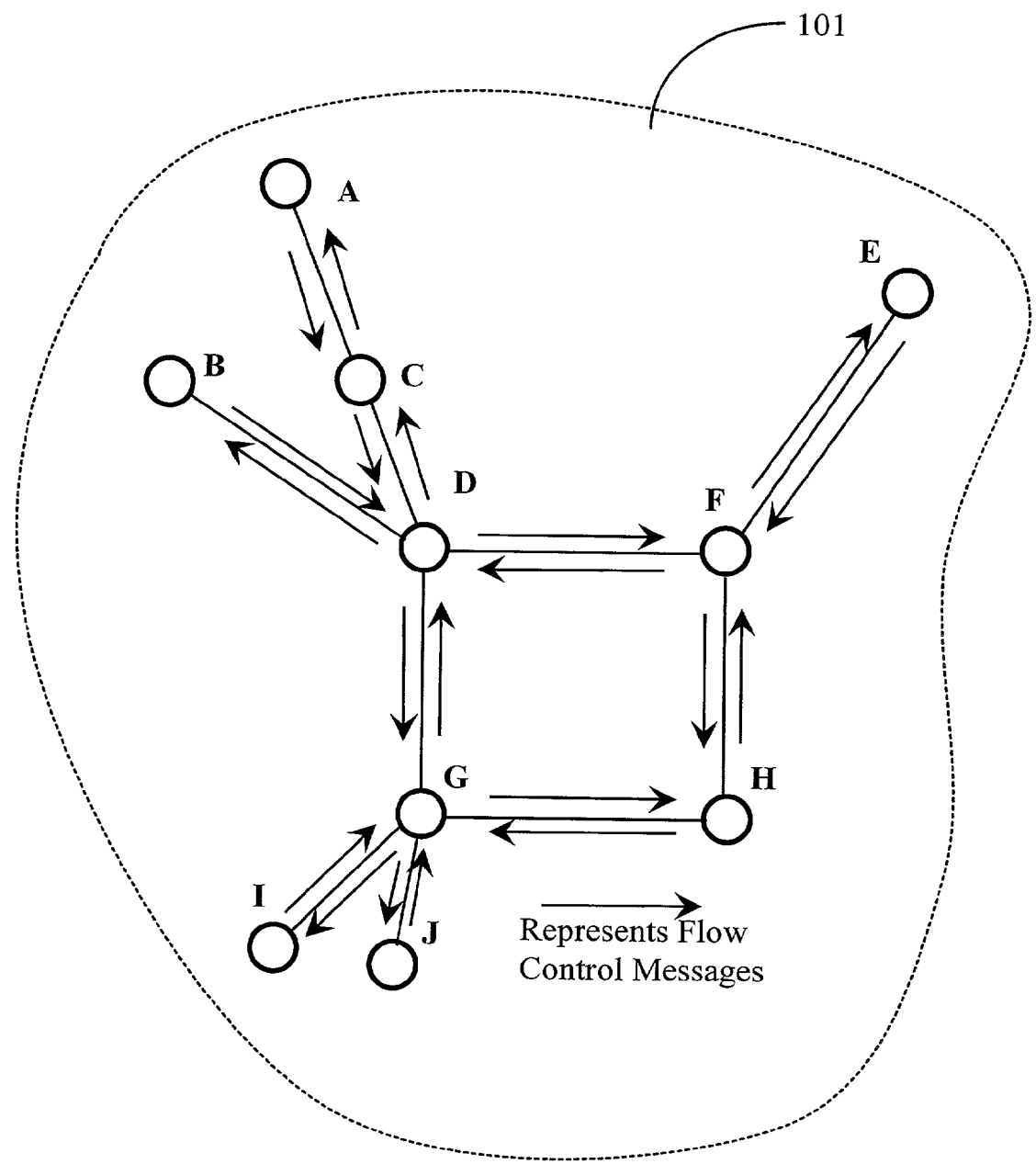
FIG. 1 is a prior art diagram illustrating fabric node interconnections and upstream propagation of flow control messages.
Figure 2:
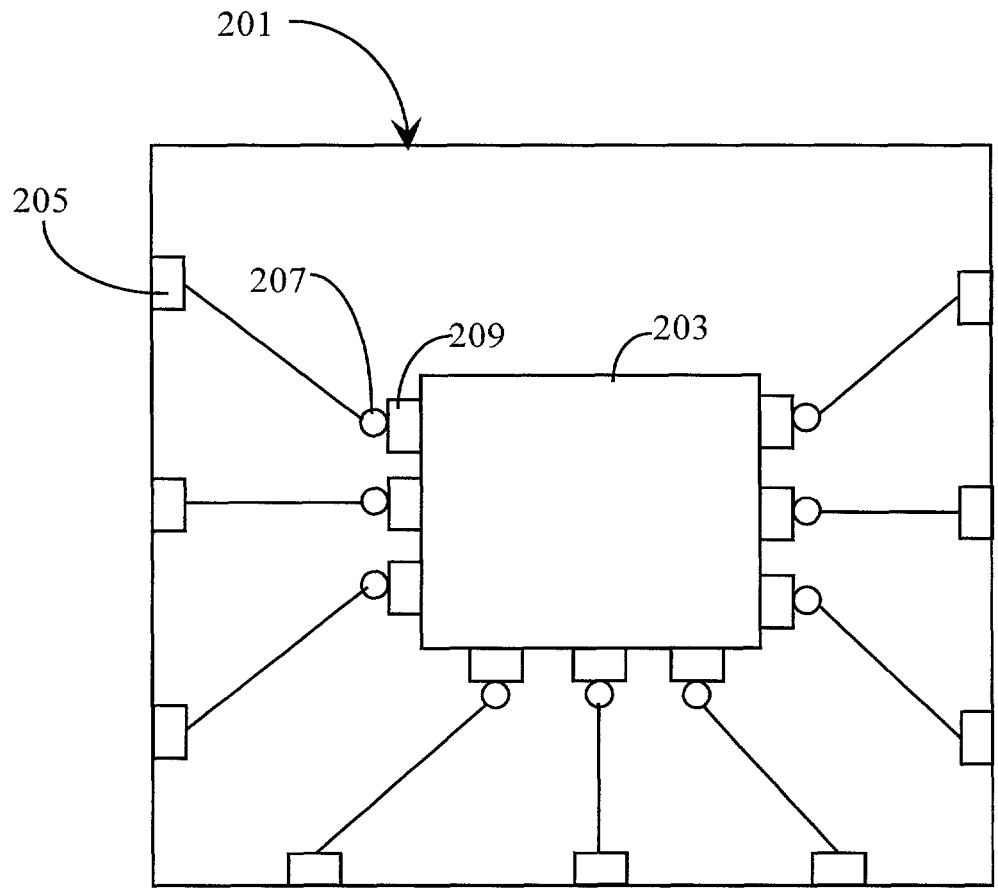
FIG. 2 is a diagram of a fabric card in an embodiment of the present invention.

FIG. 2 is a plan view of a fabric card 201 in an embodiment of the present invention. In this embodiment there are nine (9) ports on each card, rather than four as indicated in the prior art diagram of FIG. 1. This is not meant to imply that the prior art is limited to four ports per node, as FIG. 1 was exemplary only.

In the fabric card of this embodiment, as shown in FIG. 2, there are nine queue managers 209, one for each external port 205, with each queue manager isolated from its connected external port by an optical interface 207. The inter-node communication in this embodiment is by optical links. Queue managers 209 interface with crossbar 203, which connects each of the nine ports with the other eight ports internally in this embodiment, although these internal connections are not shown in the interest of simplicity.

Figure 3:
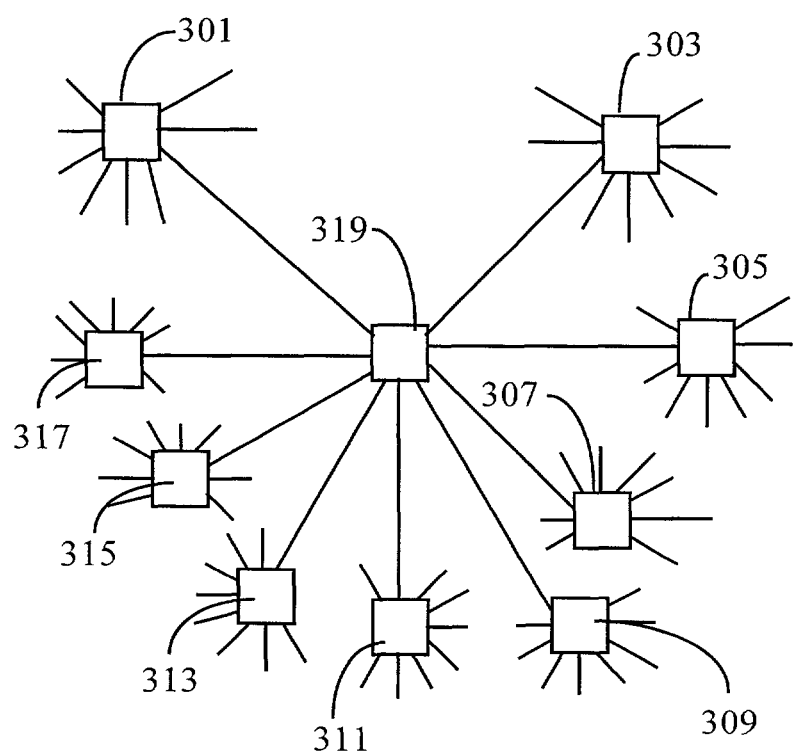
FIG. 3 is a diagram of a fabric network of fabric cards in an embodiment of the present invention.

FIG. 3 is a diagram illustrating a fabric having interconnected fabric cards according to the embodiment described above with reference to FIG. 2. In this diagram one card 319 is shown connected to nine neighbor cards 301, 303, 305, 307, 309, 311, 313, 315, and 317. Each of the neighbor cards is illustrated as having eight additional ports for interconnecting to further neighbors in addition to the one port connecting the near neighbor with card 319. It will be clear to the skilled artisan from this diagram that interconnection complexity escalates at a very great rate as ports and cards (nodes) proliferate.

Referring now back to FIG. 2, each port on each card passes through a queue management gate 209 as indicated in FIG. 2. Each queue manager comprises a temporary storage queue with controls for managing flow in the incoming direction. Data traffic coming in on any one port, for example, passes through a first-in-first-out (FIFO) queue, and the queue manager is simply enabled to discard all traffic when the queue overflows. There are, in this scheme, no Flow Control messages generated and propagated upstream as in the prior art. The size of each queue is set to provide adequate flow under ordinary, and to some extent extraordinary load conditions without data loss, but under extreme conditions data is simply discarded until the situation corrects, which the inventors have found to be less conducive of data loss than the problems associated with conventional flow control, which uses the upstream propagated Flow Control messages.

In an alternative embodiment of the present invention each queue manager on a card has an ability to begin to drop packets at a pre-determined rate at some threshold in queue capacity short of a full queue. In certain embodiments further the queue manager may accelerate the rate of packet dropping as a queue continues to fill above the first threshold. In these embodiments the incidence of dropping packets is minimized, and spread over more traffic than would be the case if dropping of packets were to begin only at a full queue, wherein all packets would be dropped until the queue were to begin to empty.

A distinct advantage of the queue management scheme of the present invention is that the intelligence required is considerably lessened, and there is no artificial addition to the traffic load by generating Flow Control messages.

It will be apparent to the person with ordinary skill in the art that the embodiments of the invention described in this specification are exemplary, and may vary in a number of ways without departing form the spirit and scope of the present invention. For example, there may be more or fewer than nine ports and queue managers per card, and the size of each queue may vary.

Multicasting Data within Router Fabric

According to another aspect of the present invention a router fabric card analogous to the card of FIG. 2. Above is enhanced by virtue of added circuitry for the purpose of performing on-board, and in some instances, off-board multicasting of data packets.

Figure 4:
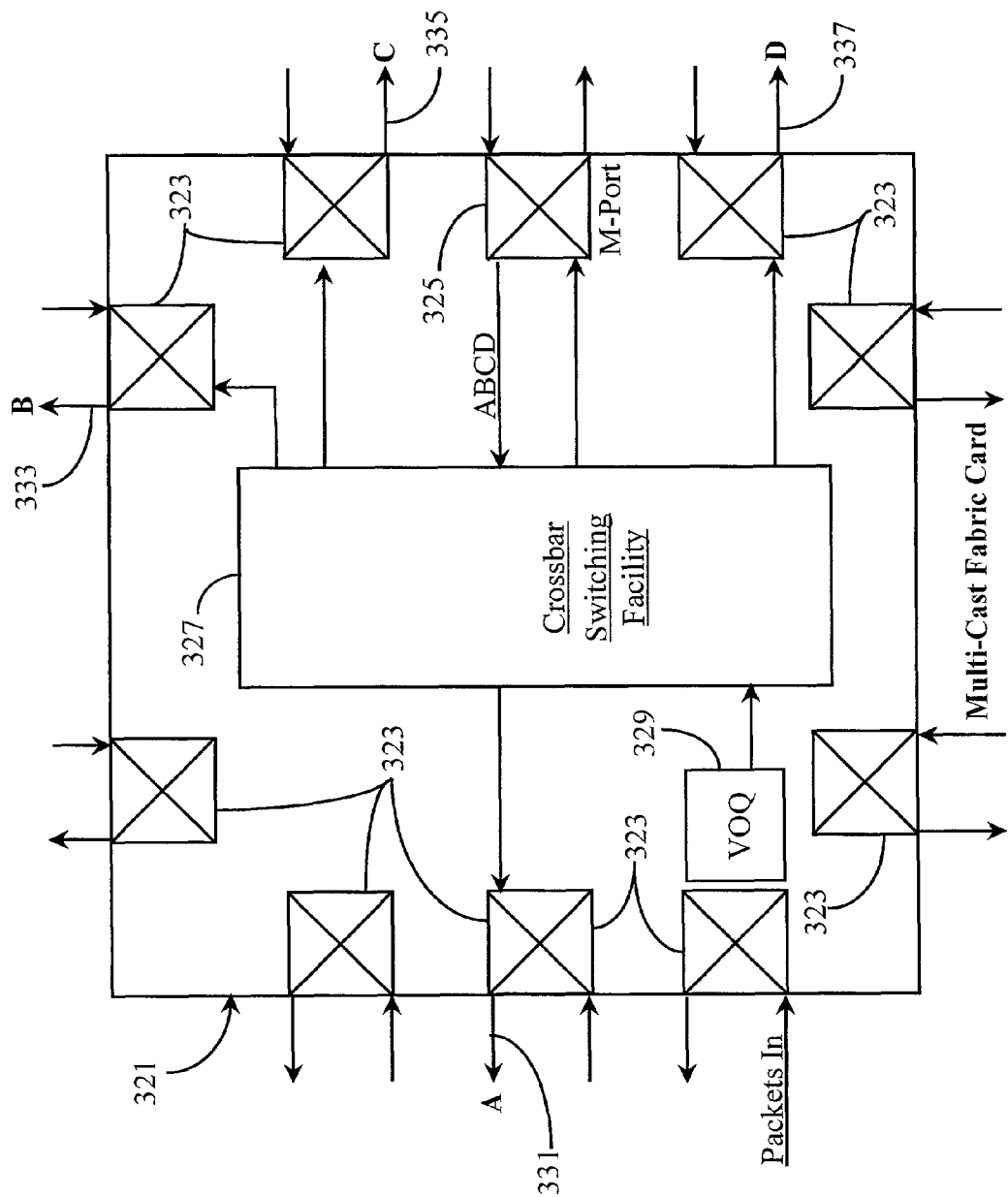
FIG. 4 is a diagram of a fabric card of a data router having multicasting capability via a multicast port according to an embodiment of the present invention.

FIG. 4 is a plan view of a fabric card 321 of a data router having multicasting capability according to an embodiment of the present invention. In this embodiment a Multicast Fabric Card 321 is configured with an M-Port (multicasting port) 325. Card 321 also has a plurality of Virtual Output Queues, one of which is illustrated in this example as a (VOQ) 329. Typically a VOQ is implemented at each port of the card, although all are not shown in FIG. 4 for the sake of simplicity. Card 321 also has a Crossbar Switching Facility 327 implemented thereon and nine (9) ingress/egress ports 323 such as were described with reference to FIG. 2 above.

M-Port 325 is an added ingress/egress port in this embodiment, which is enhanced in this example with multicasting capability. Each port 323 on card 321 is, in a preferred embodiment, an ASIC chip. However, in certain embodiments, a chip set or other implementation may be used. Crossbar Switching Facility 327 is adapted for provision of switching function and negotiation between ingress and egress port 323 of card 321. The integrated components and detail of the functionality of the Crossbar Switching Facility 327 is not illustrated in this example as such detail is not considered significant to the scope of this invention. The makeup of the routing fabric of a given router in this example may be assumed to contain a plurality of cards 321.

Virtual Output Queue (VOQ) 329 is logically illustrated between one of ingress/egress ports 323 and Crossbar Switching Facility 327. VOQ 329 contains a queue for every egress (output) on card 321 including one for M-port 325 and one for the multicasting component of M-port 325, which is further detailed below. The direction of data flow from VOQ 329 into facility 327 is indicated by a directional arrow illustrated there between. In actual practice, there is a VOQ 329 implemented for each of the nine ports 323 and one for M-Port 325, operating on ingress traffic at each port. Each VOQ is partitioned into a plurality of queues representing all egress destinations of card 321 as previously described.

The intrinsic design of card 321 leaves provision for installing more than one multicast port (M-Port 325) on each card, however in this exemplary diagram, only one M-Port is shown, and this is deemed sufficient for the purpose of explaining the present invention. In addition, one or more multicast ports (325) on any one card (321) can be activated or deactivated according to projected need. Therefore on a fabric card (321) with multiple multicast ports (325), one, two, or more multicast ports may be activated for service depending on projected load and needs of the multicast system. When projected volume of a particular multicast assignment demands, some or all multicast ports on enhanced fabric cards within a router may be activated for the duration of the increased load. It is noted herein that all fabric cards in a router need not be enhanced for multicasting but it may be assumed that a plurality of cards in a fabric of any router or routers (distributed) may be multicast enhanced.

In a preferred embodiment, a multicast assignment is orchestrated to fan out through fabric within a router, and such an assignment may also be distributed to communicating multicast-enhanced routers distributed strategically throughout the topology of a data network. In this way, a natural load balance may be achieved and processing is efficiently distributed, rather than the inefficient present system of generating multiple copies at one place, and then sending all through the network. For a very large assignment a plurality of multicast-enhanced routers may perform assigned portions of the entire project.

Returning again to FIG. 4, data packets destined for multicasting in M-port 325 enter card 321 as indicated by a directional arrow labeled Packets In (ingress to one of ports 323). Packets may arrive at any one of ports 323 that are coupled by port paths to output ports of the fabric card. Packet In represents multicast data packets destined for M-port 325 and are queued for M-port 325 in VOQ 329. It is again noted that VOQ 329 functions as a set of queues with a queue manager, and the queues are associated with output ports. VOQ 329 manages incoming data traffic and functions as a temporary storage queue with control for managing data flow in the incoming direction. Incoming data traffic is passed from an ingress port of card 321 to an egress port of the node as long as the queue in the path between ports is less than full as described with reference to FIG. 2 above.

A data packet for multicasting is queued by VOQ 329 in the same way that other packets are queued, except that the queue destination is M-port 325 instead of the destination of an egress (all packets identified as multicast packets are sent to the M-Port). In this example, data packets for multicasting pass from VOQ 329 through the Crossbar Switching Facility and into M-Port 325 where the data packets are replicated according to predetermined instructions. In this exemplary illustration replicated data packets are represented by the capital letters A, B, C, and D. Replicated data packet A-D are identical to one another except for destination address, which is assigned by M-Port 325 as a part of the replication process, according to information stored in a multicast group table (not shown) accessible to the multicast port. More detail about internal components of M-port 325 is provided later in this specification, particularly with reference to FIG. 5.

M-Port 325 receives the targeted data packets, as is illustrated by a directional arrow emanating from facility 327 and progressing toward port 325, and replicates the data packet into packets A-D according to instructions. The replication of incoming packets into packets with four new destinations is exemplary only, and there may be fewer or many more replications than indicated in this example.
Port 325 assigns appropriate destination addresses for packets A-D and then queues the data packets for egress to the next point in their destinations as though the replicated data packets were non-multicast incoming data packets. Packets A-D are illustrated herein as leaving port 325 back into facility 327.

In this example replicated packets A, B, C, and D are routed off card 321 at separate egress ports as indicated by directional arrows emanating from various ports 323, the arrows identified by indication of the appropriate data packets A-D and by element numbers 331, 333, 335, and 337 respectively. In this example, egress paths 331-337 carrying data packets A-D lead to ingress paths of other fabric cards, determined by their new destinations. Other fabric cards may in turn provide further packet replication. If card 321 is a last card before router output, then the replicated packets are routed to a next router for further processing, which may, in some projects, include more packet replication. It is noted herein that it is not required that packets A, B, C, and D be routed off card 321 using separate paths as illustrated in order to practice the invention. In one embodiment, all packets could be routed off card 321 using a single or several ports. The use and selection of outgoing ports depends entirely on destination assignments of the packets concerned. For example, it is not required that a particular multicast packet, which may be a replicate, be routed to multiple multicast-capable ports in succession for further replication. In fact, a designation of unicast may be applied for a time to a particular packet causing it to be routed as a normal data packet until, perhaps after routing through several cards within a router, it enters a card wherein further multicasting will be performed. At entrance to the desired card, the unicast designation will be stripped from the packet header of a particular packet revealing the multicast destination to an M-port on the card. Addressing manipulation capability can be performed at any input port on any router card by port manipulation of packet headers.

It will be apparent to one with skill in the art that card 321 may have more or fewer ports 323 than are illustrated in this example without departing from the spirit and scope of the present invention. Likewise, there may be more than just one M-port 325 integrated onto card 321. The number of both conventional ports and ports enhanced for multicasting, as well as their activity states during operation, is a matter of design and implementation.

Figure 5:
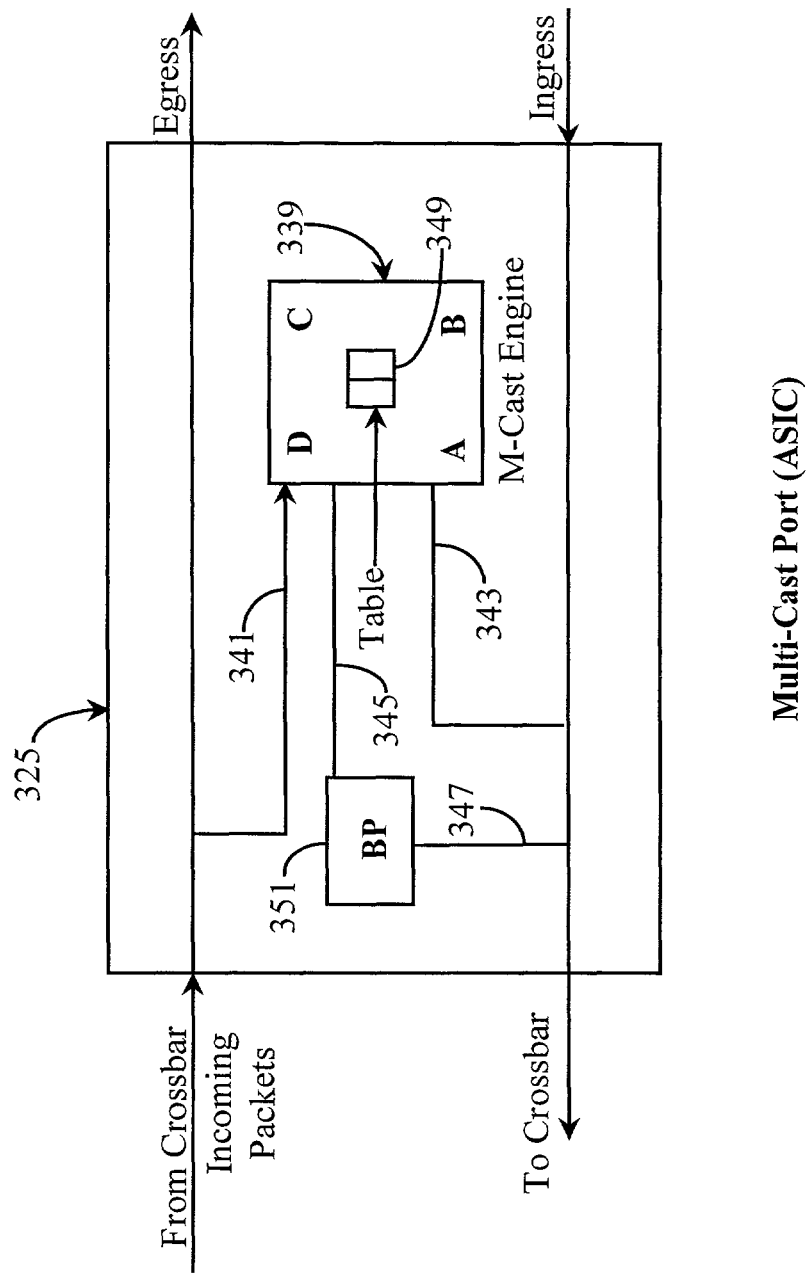
FIG. 5 is a block diagram illustrating components of the multicast port of FIG. 4.

FIG. 5 is a block diagram illustrating various components and connectivity of M-Port 325 of FIG. 4 in an embodiment of the present invention. In addition to the multicasting role of M-Port 325 as described above, data packets not designated for multicasting may have ingress/egress through this port with requirements for exclusion of data in or out during periods when the multicast port is actively involved with multicasting/replicating duties. In this example, the fact that normal traffic cannot use port 325 during active multicasting is due to the fact that, in this embodiment, multicast packets are looped back into the system (card) as incoming packets. However, in a more enhanced embodiment, additional components may be added to enable both normal traffic and multicast traffic to utilize port 325 simultaneously.

Port 325 is illustrated with an egress path (from C-Bar to egress) and an ingress path (from ingress to C-Bar). These paths comprise the basic routing paths of port 325 for normal (non-multicast traffic). A multicast (M-Cast) engine 339 is provided as the replicating component of port 325. Engine 339 may be implemented with basic logic circuitry as an integrated part of the ASIC enabling port 325, or as a separate chip in some embodiments. It is noted herein that engine 339 is ported to enable receipt of data as well as communication with other port-engines on a same fabric card and on other multicast-capable fabric cards.

Basic functionality in the present embodiment of the invention involves incoming multicast packets destined for port 325 (identified herein as Incoming Packets) entering port 325 from the Crossbar Switching Facility (327, FIG. 4) and delivered to engine 339 by an input line 341 for packet replication.

Packets identified as packets A, B, C, and D illustrated within engine 339 are subject to destination address assignment by engine 339 from routing information stored in a table 349 also illustrated within engine 339. Table 349 contains a list of IP destinations of a multicast group for a given multicast project. Table 349 is periodically updated and propagated between active multicast ports as was described with reference to FIG. 4 above.

Multicast engine 339 replicates data packets based on instruction, in this example packets A-D. It is noted herein that an incoming data packet functioning as a source for replication may be dropped after replication, or may be retained with the same or a new destination address assigned thereto. More specifically, one of packets A-D may be the source packet (3 replications), or all packets A-D may be replications with the source packet dropped (four replications). States of addresses (taken or not) in table 349 are updated as used in order to provide current information to all ports during an active multicast project. Table 349 is periodically updated at all multicast ports within a router fabric, and in some cases among multiple routers, in order for all ports to remain current with regard to how many replications of data packets need to be generated and what ultimate destinations need to be assigned to the replicated packets.

Once engine 339 completes the replication and address assignment for a given (assigned) portion of a multicast project, replicated data packets, represented in this example as A, B, C, and D, are transmitted via exemplary line 343 to the ingress path of port 325 as incoming data packets. Packets A-D are then queued in appropriate sections of a VOQ (not shown) associated with port 325. Packets A-D ultimately enter Crossbar Switching Facility 327 (FIG. 4) for distribution over various paths according to the assigned addresses for the replicated data packets. It is noted herein that the clock speed of port 325 is essentially the same as any of ports 323 (FIG. 4). However, in one embodiment, the speed of replication is enhanced by using an increased clock speed for M-Cast Engine 339 above that of other ASIC devices in the fabric card.

In order to maintain appropriate management of data flow through port 325, a Back-Pressure (BP) module 351 is provided and adapted to prevent input of new data into port 325 during replicating (multicasting) activity of the engine. BP module 351 interfaces with M-Cast engine 339 via a control line 345 to monitor the ongoing activity of the engine. When it is determined that engine 339 is fully involved with replicating and address assignment of data packets during a particular multicast project, BP module 351 notifies Crossbar Switching Facility (327) via a control line 347 not to input additional new data packets for processing by the engine until the current effort is completed.

It will be apparent to one with skill in the art that engine 339 may replicate a higher or lower number of data packets than the number illustrated in this example without departing from the spirit and scope of the invention. The number of packets replicated is determined from assignment data. In a preferred embodiment, all active engines during a project receive a similar portion of a multicast project. However, in more advanced embodiments, existing network load conditions including predictive algorithms may be used to change multicast assignments with respect to engines, cards, and even routers involved. There may be many such embodiments.

Figure 6:
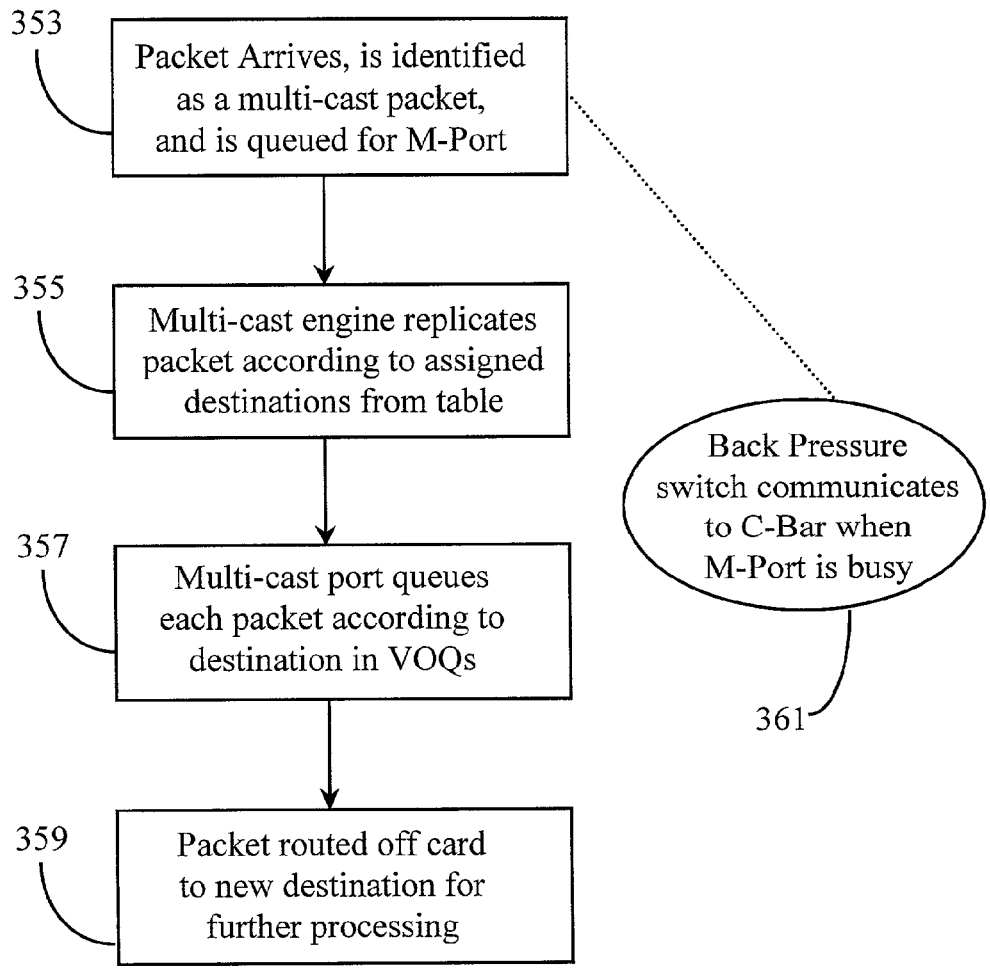
FIG. 6 is a flow diagram illustrating a packet replication process of a multicast fabric card according to an embodiment of the present invention.

FIG. 6 is a flow diagram illustrating basic steps of data packet processing by the Multicast Fabric Card described with reference to FIG. 4. According to an embodiment of the present invention step 353 denotes the arrival of a data packet designated for multicasting. The data packet, arriving through an ingress path of a multicast-enabled card is queued for an M-Port analogous to port 325 of FIG. 4. The queuing assignment is based on destination addressing of the incoming packet. A dotted line illustrated in this example from Step 353 to Step 361 denotes a continuous monitoring of data flow to the multicasting port of step 353 by a BP Module analogous to module 351 of FIG. 5. As described with reference to FIG. 5, BP module 351 communicates to Crossbar Switching Facility (327) when port 325 is busy with packet replication and address assignment activity.

At step 355, the multicast engine within the port of step 353 replicates the packet the necessary number of times, and assigns destination addresses according to a multicast group table analogous to table 349 of FIG. 5.

In Step 357 the multicast port of step 353 queues each replicated packet according to destination into a VOQ analogous to queue 329 of FIG. 4. Such a VOQ exists at each ingress/egress port of a fabric card. Each queued packet resides in queue according to its assigned destination address for egress from a multicast card. In Step 359 each packet is routed from the fabric card along a predetermined path to its assigned destination for further processing as required for a given multitask project. In some cases the destination leads to ingress at a port on another multicast card. In some cases, a next card will not be a multicast card. In some cases egress is to a next router or to a final IP destination.

It will be apparent to one with skill in the art that the process steps illustrated in this example may be further broken down into sub-steps without departing from the spirit and scope of the present invention. For example, a sub-step may be included before step 355 for updating a multicast group table. It will also be apparent to one skilled in the art that the embodiments of the invention described in this specification are exemplary and may vary in a number of ways or configurations without departing from the spirit and scope of the present invention. For example, a fabric card may contain more or fewer than nine ports and any one or all of the ports may be multicasting ports. Likewise, in some embodiments, the clock speed of included multicasting ports may be varied and selectable depending on the load of data packet transmission, as previously described.

According to an alternative embodiment, a multicasting card may be connected to a multicasting port of a fabric card, the multicasting card provided as an external addition. In this case data packets for multicasting egress from the fabric card into the multicasting card, where the replication and destination assignments are made, then egress from the multicasting card back into the fabric card for re-routing according to the newly-assigned addresses. In some cases using an external port, the egress of the port may be coupled to a next card having a dedicated multicast ingress port.

The present invention may be implemented in a variety of configurations of interconnected fabric cards, and routers enhanced to practice the invention may be geographically distributed within a given network topology in order to enhance multicasting capability throughout the topology. One skilled in the art will recognize that multicasting efficiency escalates proportionally at a tremendous rate as additional cards and ports are added to single routers and as similarly enhanced routers are distributed within a multicast region.

Distributing Forwarding Instructions

In one aspect of the present invention, multicast forwarding information is distributed in parts or portions to line processors that are expecting multicast data, and the distributed data is used to build a forwarding table for the multicast data expected to arrive at physical ports at the target.

Figure 7:
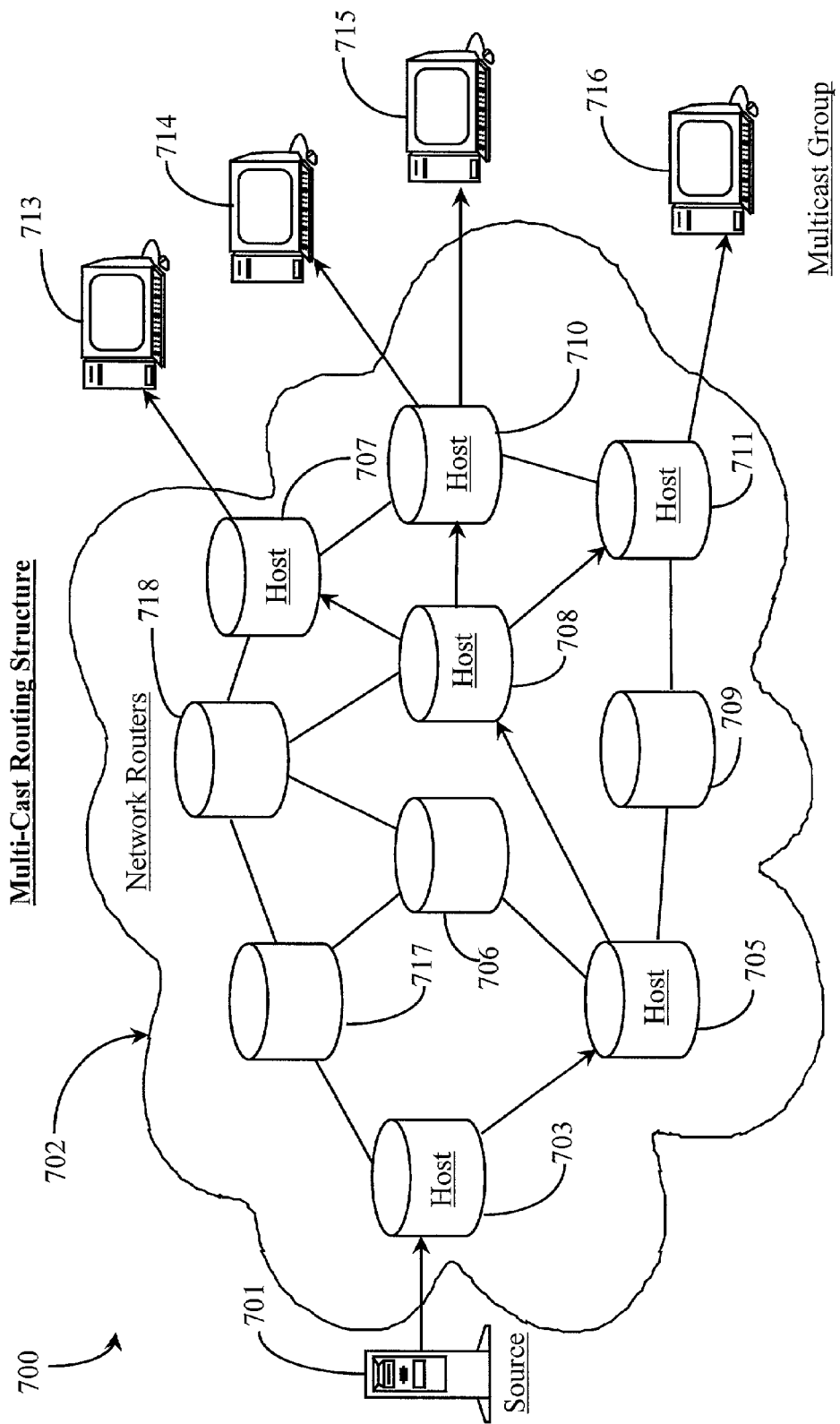
FIG. 7 is a topology diagram of a typical multi-cast data route from source to group.

FIG. 7 is a topology diagram of a typical multi-cast data route from a source to a group. As described in the background section, PIM SM requires group subscription to multicast data. A network topology 700 comprises plurality 702 of network routers. Routers 702 may be single processor routers according to prior art consideration. In a preferred embodiment however, it will be assumed that at least some routers of topology 702 are TNRs or multiple-processor routers having multiple interfaces as was described in the background section above.

Upstream from routers 702 is a source (S) system 701, which may be a router or a multicast-capable server or any other type of system capable of forwarding multicast data. A plurality of end systems 713-716 is illustrated on the downstream side of topology 700. Systems 713-716 are considered a multicast group (G). In this example, the multicast group (713-716) is illustrated as network-connected computer systems. However in other embodiments there may be other types of devices included in the multicast group. For example, Laptop computers, Internet-capable cellular telephones, personal digital assistants (PDAs) or any other known Internet-capable device whether hardwired or wirelessly connected.

In this example, PIM SM is practiced wherein each system (713-716) of the multicast group is registered in the group and receives multicast data from an upstream host router within group 702. A Host router is defined as a router in a path of multicast data traffic between a source and a final destination. Routers 703, 705, 707, 708, 710, and 711) are illustrated as host routers in this example. Each host router in this example is responsible for a certain portion of a multicast assignment and performs the required packet replication and forwarding functions to downstream hosts. Host routers are responsible for forwarding multicast data toward a group address, which is referred to in this specification as (G). Every downstream host requests the required amount of multicast data from upstream peers.

The paths through which multicast data travels through topology 700 are represented by directional arrows. For example, host routers 707, 710, and 711 subscribe to PIM SM and request streams from upstream host 708, which in turn requests a stream from upstream host 705. In turn, host router 705 requests its data from Host 703, which requests its data from source system 701.

Source system 701 is, in this example, the multicast source (S) and forwards a single multicast stream to downstream host 703. Host 703 receives the multicast data at a known physical upstream interface, replicates the required number of data packets and then forwards the multicast data to a next downstream host that has requested data, in this case, host router 705, which forwards requested data to host 708. Host router 708 must multicast the received data to satisfy requests from routers 707, 710, and 711, which in turn must satisfy the end systems 713-716 comprising the multicast group.

Routers 709, 717, 718, and 706 of group 702 are not part of the multicast assignment described herein. That is to say that they are not receiving, replicating, or forwarding any multicast data. However, routers 705, 703, and 706 could join the multicast group at anytime if requested to do so from downstream systems.

It will be apparent to one with skill in the art that there may be many more end systems and hosts involved in a multicast distribution scheme than there are illustrated in this example. The inventor deems that this simple representation adequately illustrates multicast forwarding between nodes in a network to a group wherein the data is replicated as it is forwarded downstream to the final destinations.

According to a preferred embodiment, host routers 703, 705, 707, 708, 710, and 711 expect multicast data to arrive for processing at specific upstream interfaces. The port addresses are included in their requests for multicast data according to G calculated metrics for each host. Because the host routers are TNR, or otherwise multiple-processor routers, and it is known which upstream interfaces of these routers will receive multicast data, it is not necessary to consult an entire table of forwarding information as is the case for prior-art routers engaging in multicast forwarding. A goal of the present invention is to provide a mechanism for parsing and distributing portions of a multicast-forwarding table of a router to multicast-enabled upstream processors before expected multicast data arrives at the interfaces.

Figure 8:
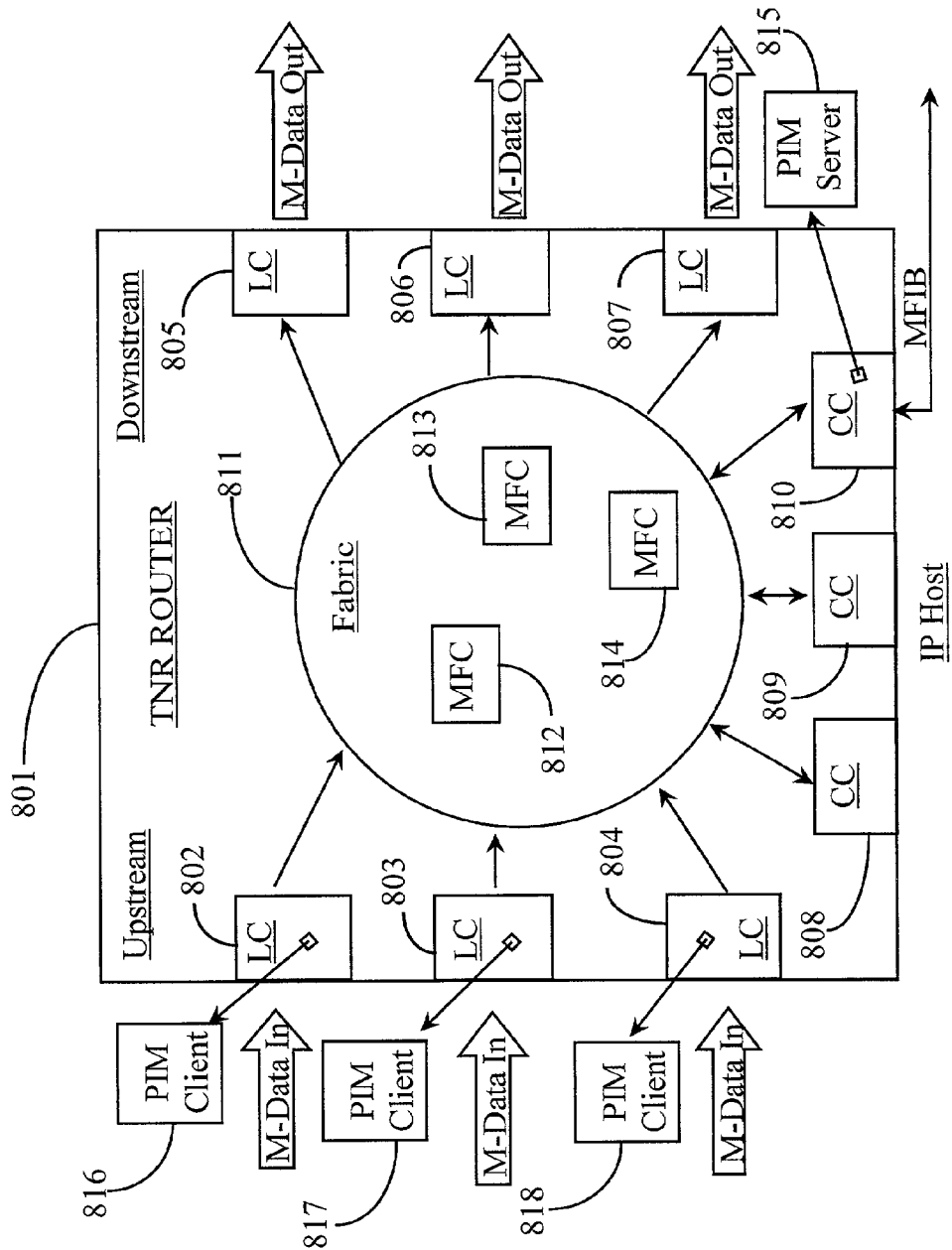
FIG. 8 is a block diagram illustrating components of one of the routers of FIG. 7 practicing multicast forwarding according to an embodiment of the present invention.

FIG. 8 is a block diagram illustrating components of one of the host routers of FIG. 7 practicing multicast forwarding according to an embodiment of the present invention. A TNR 801 is illustrated in this example, and could be any one of the host routers of topology 702 described with reference to FIG. 7. TNR 801 comprises line cards, control cards and fabric cards in a distributed processor architecture as was described with reference to the background section of this specification. Line cards 802-807 represent line interfaces with processors, serving as interfaces between TNR 801 and a connected external network. An internal routing fabric 811 represents a plurality of interconnected (ported) fabric cards that make up the internal routing network of TNR 801. In this example, only multicast-capable fabric cards (MFC) 812-814 are illustrated in fabric 811, although there may be fabric cards that are not multicast-capable. MFCs 812-814 are responsible for packet replication as described above with reference to priority document Ser. No. 09/854,234.

A plurality of control cards (CC) 808-810 is illustrated within TNR 801 and are adapted to provide data distribution including protocol and boot instruction to fabric and line cards as well as special packet processing requirements as described with reference to the background section. CCs 808-810, as the name implies, provide control functions for processor interaction and data processing function within TNR 801.

TNR 801 for the purpose of this example in a multicast topology has an upstream side and a downstream side in relation to other routers in a group relative to multicast data. LCs 802-804 are illustrated in this example as upstream (ingress) interfaces while LCs 805-807 are illustrated as downstream interfaces (egress). One with skill in the art of data routing will understand that all of the illustrated interfaces are in practice bi-directional, and the one directional example is an artifice for easier explanation. Upstream and Downstream designation of interfaces of TNR 801 are simplified logically to better explain the invention in terms of a multicast assignment.

On the side of TNR 801 labeled Upstream, LCs 802-804 are illustrated as actively receiving multicast data represented herein by block arrows labeled M-Data In pointing to each LC 802-804. On the side of TNR labeled Downstream, LCs 805-807 are illustrated as actively forwarding data out to a next node or nodes. Block arrows labeled M-Data Out pointing away from LCs 805-807 represent this activity.

Generally speaking, in TNR 801, all data including multicast data travels from a line card through fabric 811 to another, or back to the same line card before leaving TNR 801. Unidirectional arrows emanating from LCs 802-804, progressing into fabric 811, and arrows emanating from fabric 811 and then progressing to LCs 805-807 illustrate data-forwarding in TNR 801 for this example.

In this example, multicast forwarding follows a PIM protocol. In other examples, other similar multicast protocols may be adapted for TNR 801. In most prior art implementations, PIM software is provided on single-processor routers as a single application running on a main processor. In this example, PIM software is implemented as a server/client software application wherein there are multiple client modules.

A PIM server application 815 is provided to execute on CC 810 in this example. CC 810 is designated to handle PIM control and protocol as well as routing information distribution for all designated LCs having upstream ports that will receive multicast data for processing. It is noted herein that LCs 802-807 each have multiple physical ports. Each LC 802-804 on the upstream side of TNR 801 has a PIM client running thereon. LC 802 has a PIM client 816, LC 803 has a PIM client 817, and LC 804 has a PIM client 818. It is noted that in some embodiments, all LCs within TNR 801 may have an executable PIM client installed. All LCs, because of their multiple port interfaces and bi-directional port capabilities, can be considered upstream interfaces in multicast topologies.

CC 810 has an interface capability with a database entity termed a multicast forwarding information base (MFIB). An MFIB contains all of the paths and forwarding tables for all multicast activity occurring in the topology that includes TNR 801. PIM server 815 has access to the entire information base and in some embodiments may obtain the entire base for local storage and periodic update. When TNR 801 requests to join in receiving multicast data for a particular G from any source (*,G), PIM server 815 distributes enough data to any of the particular LCs having upstream ports that will receive multicast data packets for that particular G. It is noted herein that a plurality of physical interfaces supported on one or more than one LC may be aggregated as a bonded interface that is seen as a single logical interface in layer 3 Internet protocols. Therefore, more than one physical port may be involved in receiving multicast data from a particular S for a particular G.

PIM clients 816-818 are identical implementations. PIM sever 815 distributes data to, for example, PIM client 816 on LC 802. The distributed data includes port configuration (if necessary), port assignment data, internal routing path information, and egress port information according to G metrics. The data enables LC 802 to receive multicast data packets for a particular G at designated physical ports and forward the data through TNR 801 to egress without having to consult any routing databases as long as the multicast packets are expected at the line interface.

It will be appreciated that there may be many multicast assignments in progress at any given time that include TNR 801 as a node in multicast forwarding for multicast groups. Therefore, LCs 816-818 will have differing portions of MFIB stored locally. In one preferred embodiment, each LC builds its own local multicast table from data building blocks received by respective PIM clients from PIM server 815. When new MFIB information is added or deleted for any of LCs 816-818, PIM server 815 updates the appropriate PIM clients.

The multicast data in sparse mode is expected because of the PIM request-to-join protocol. However, it is possible that unexpected multicast data packets may arrive at an upstream interface LC. In this case, the default treatment is for a PIM client on the receiving LC to check with PIM server 815 at the first unexpected multicast data packet to arrive at any of its ports. This, of course assumes that S, G information for the unexpected packet does not match any information on the line processor. The PIM protocol in the sparse mode will build a drop entry for the particular multicast flow of that packet and send it to the PIM client of the receiving LC. This notification is termed an assert by the inventor. Subsequent packets from the same flow arriving at the interface are dropped without further consultation. In sparse mode a router may be configured not to accept any multicast data from an upstream source that it has not requested.

PIM software server application 815 is configured to cooperate with other information applications (not shown) running on TNR 801. PIM 815 is modified by a software mechanism that can parse and isolate part of the MFIB and distribute the isolated portion to the appropriate PIM client running on the line interface that hosts the physical ports that need the information. When a LC is booted for the first time, and is expected to receive specific (S,G) multicast data packets, then all of the required forwarding information is sent to the card during or immediately after boot. After the LC is operational and forwarding multicast data then only additions and delete notifications are distributed. It is noted herein that the multicast forwarding information held in MFIB is created after TNR 801 joins a specific multicast group. Therefore, the line interfaces are prepared before actual expected data arrives.

Figure 9:
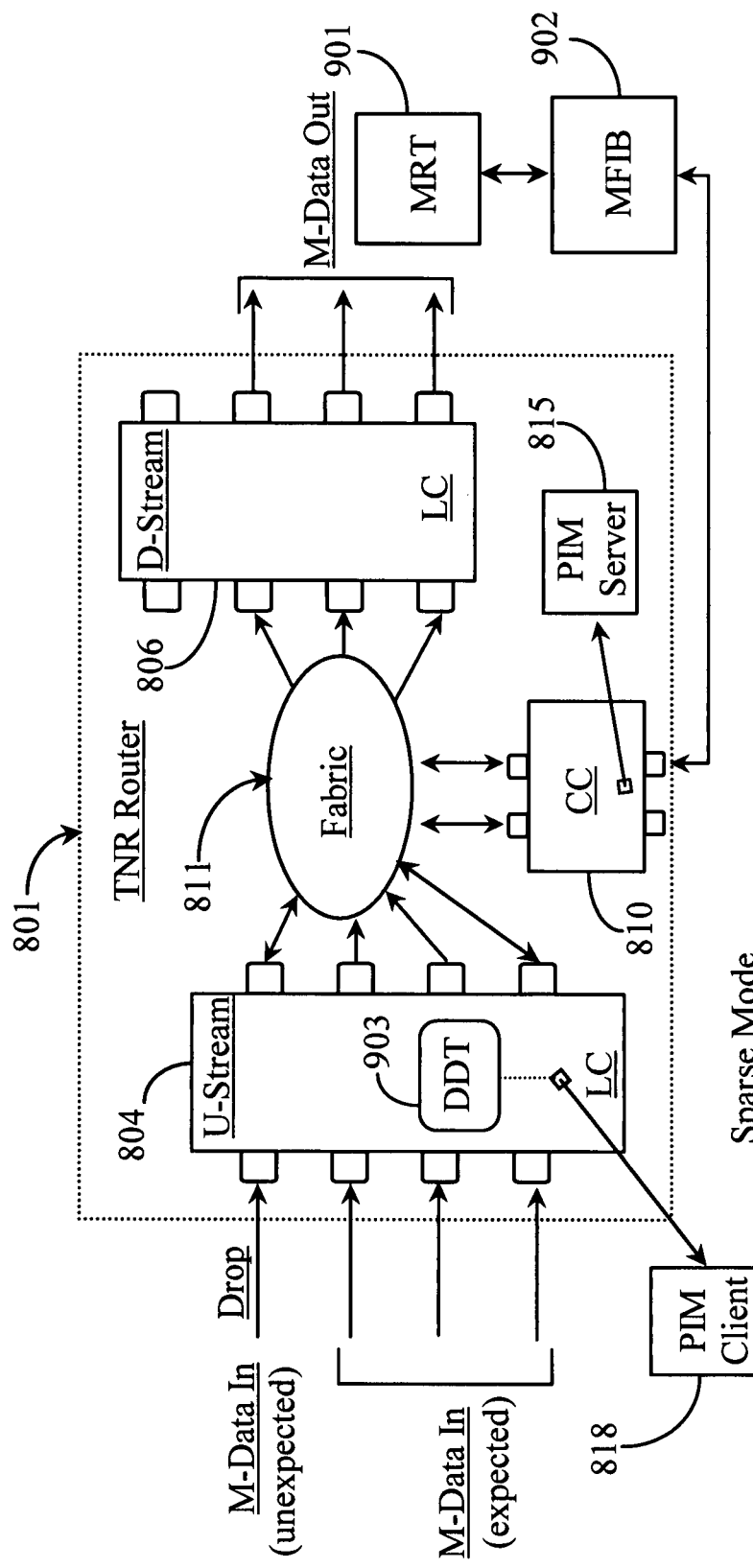
FIG. 9 is a block diagram of CC and LC communication and additional routing table components according to an embodiment of the present invention.

FIG. 9 is a block diagram illustrating CC and LC communication components of TNR 801 of FIG. 8 and additional routing information base components according to an embodiment of the present invention. Components illustrated in this example that were described with reference to FIG. 8 above are not reintroduced and have the same element numbers as in FIG. 8. Internal components of TNR 801 are expanded for more clarity in FIG. 9. LC 804 is illustrated as an upstream (U-Stream) line interface and LC 806 is illustrated as a downstream (D-Stream) line interface. Fabric 811 is illustrated without MFCs 812-814 described with reference to FIG. 8 above however they may be assumed to be present.

LC 804 has a plurality of physical ports, 8 in this example, adapted for data communication. Four of the ports are illustrated in this embodiment as outward-facing ports receiving multicast data. Three of the receiving ports are receiving expected multicast data packets as is illustrated by a bracket enclosing 3 directional arrows entering the ports and labeled M-Data In (expected). A single directional arrow entering the remaining receiving port represents receipt at the port of multicast data and is labeled M-Data In (unexpected). The port receiving unexpected multicast data packets has a Drop label associated therewith indicating that all unexpected multicast data packets are dropped at the port. Four ports on LC 804 are inward-facing ports illustrated as communicating to fabric 811. Two of these ports are engaged in control communication with CC 810, which is logically illustrated in this example as having four ports, two of which are communicating with LC 804 through fabric 811. Two physical ports of LC 804 are illustrated as forwarding multicast data into Fabric 811 for processing and eventual egress from the fabric into LC 806. LC 806 is also logically illustrated with eight physical ports, four of which are interfaced to Fabric 811 and four of which are illustrated as egress ports to an external network.

Multicast data regressing from fabric 811 is illustrated as entering three ports on LC 806 by directional arrows emanating from fabric 811 and entering the ports. Three ports on the external interfacing (D-Stream side) of LC 806 are illustrated logically as forwarding the multicast data to a next peer destination; the described ports are associated by an illustrated bracket labeled M-Data Out. Two of the physical ports on LC 806 are illustrated as not active in the illustration.

CC 810 has a port that is illustrated as communicating with an MFIB 902, which is analogous to the MFIB described above with reference to FIG. 8, and referred to as a multicast forwarding information base. MFIB 902 contains all of the routing and path information required for receiving and forwarding all expected multicast packets through TNR 801 to egress. MFIB 902 may be an external or an internal database. MFIB gets multicast routing information from a larger management routing table (MRT) 901, which also includes all of the unicast routing parameters. Each database is organized under a well-known tree format. An MFIB entry contains S and G information, ingress port address information, circuit address information including MFC port addresses for packet replication, and egress port information.

PIM server 815 obtains all of the required information from MFIB over an illustrated bidirectional link between MFIB 902 and a port on CC 810. It is noted herein that all illustrations of port communication capability and communication between components of TNR 801 are meant to be logically understood and may not represent actual dedicated physical paths.

PIM server 815, in a preferred embodiment, controls identification and distribution of MFIB routing data to all operative LCs within TNR 801 that may receive multicast data packets. In one embodiment, every LC has a PIM client established thereon whether the particular LC is involved in multicast forwarding or not at any given time. PIM client 818 on LC 804 has a dynamic data table (DDT) 903 associated therewith. Table 903 contains all of the required information for forwarding of multicast packets expected to arrive at the 3 ports labeled M-Data In (expected). DDT 903 also contains the required information for dropping all multicast data arriving at the port on LC 804 labeled M-Data In (unexpected). DDT 903 is dynamic in that it can be periodically updated through PIM server/client communication. Some of the information may be pushed to PIM client 818 and some may be requested.

In the case of expected multicast data, all forwarding is performed without a requirement for PIM client/server communication by the fact that all of the MFIB routing information for those ports is stored locally in DDT 903. However, in case a multicast packet arrives wherein S,G information does not match any current data in DDT 903, then PIM client/Server communication is required at receipt of the first packet. If MFIB 902 has instruction for the particular packet, then DDT 903 is updated with the new information. However, if the packet is deemed unexpected (not requested by TNR 801) then it and all subsequent packet of the same flow are dropped as is the case with the port on LC 804 labeled Drop. Circuit ID sequences between ingress of LC 804 and egress of LC 806, of course vary for different multicast flows and for multicast packets of a same flow replicated into separate flows.

In this example, two ports of LC 804 are sending multicast data into fabric 811 while ports on LC 806 are receiving the resulting data load. Actual packet replication occurs in a preferred embodiment within fabric 811 by multicast-enabled fabric cards analogous to MFCs 812-814 described with reference to FIG. 8. Bi-directional arrows between CC 810 and fabric 811 and between fabric 811 and LC 804 logically illustrate PIM server/client communication and/or data distribution.

It will be apparent to one with skill in the art that by practicing PIM SM in a distributed manner and distributing only information required to complete forwarding of expected multicast data, much control messaging and table searching normally required in multicast forwarding is eliminated. Even in the case of unexpected data control messaging and consultation with a multicast routing table is sharply reduced.

Figure 10:
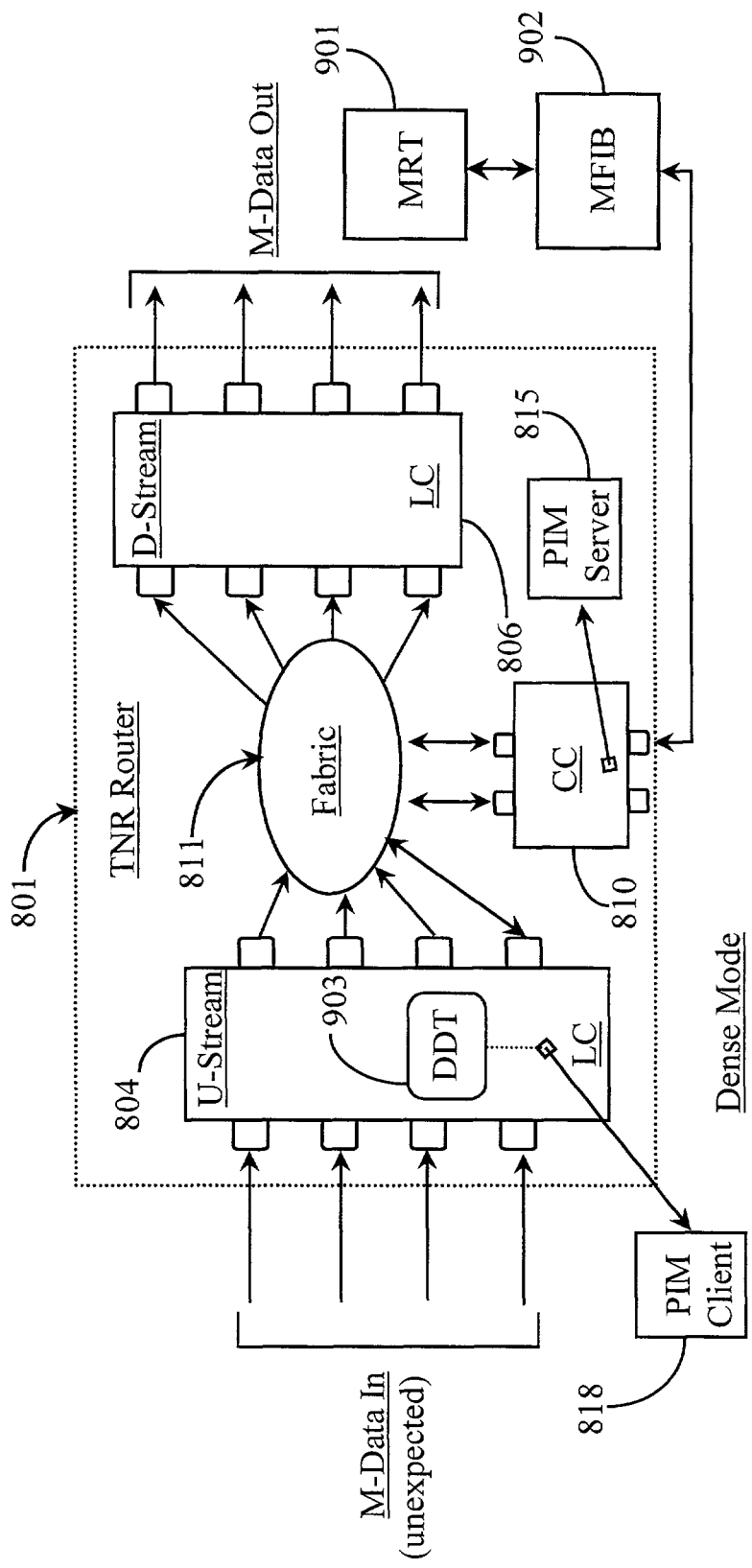
FIG. 10 is a block diagram of the components of FIG. 9 wherein a dense mode is practiced.

FIG. 10 is a block diagram of the components of TNR 801 of FIG. 9 wherein PIM DM is practiced according to an embodiment of the present invention. Components illustrated in this example that were described with reference to FIGS. 8 and 9 above are not reintroduced and have the same element numbers. In this example of dense mode (PIM DM) operation, all network-interfaced ports on LC 804 are illustrated as receiving unexpected multicast data. It was described with reference to the background section above, that PIM DM operates according to a push model wherein the multicast data packets are pushed to all corners of the network. In this case all first multicast packets of respective flows entering TNR 801 are unexpected. PIM client 818 will initiate client/server PIM communication through fabric 811 upon occurrence of the first multicast data packet from a particular source arriving at any one of the active ports.

PIM server 815 in this case initiates consultation with MFIB 902, which may trigger communication between MFIB 902 and MRT 901 to establish a forwarding state for a particular (S, G) packet. All first packets having unknown (S, G) data arriving at any port of LC 804 trigger the above mentioned client/server communication. PIM server 815 creates forwarding state information and distributes that information through fabric 811 to LC 804 where it is stored in DDT 903. All subsequent multicast packets arriving in the same flow now have established forwarding instructions stored locally on LC 804. Therefore all subsequent multicast packets are expected and can be forwarded through to egress of TNR 801 without further consultation. Because initial multicast packets are unexpected in dense mode operation of PIM, a timeout period may be established for DDT 903 to delete old table entries in DDT 903 that no longer apply.

In this particular example there are 4 ports on LC 804 receiving multicast data with 3 ports actively forwarding the data into fabric 811. On the downstream side of TNR 801 all ports of LC 806 are active for receiving multicast data from fabric 811 and 4 actively forwarding the multicast data onto the next peer. It is important to note herein that PIM DM does not require that TNR 801 join any multicast group. Initial client/server PIM consultation and forwarding state creation and distribution to appropriate line interfaces enables subsequent multicast packets to be expected and automatically forwarded at the interfaces without further consultation.

In actual practice of the invention a distributed processor router such as TNR 801 may be actively forwarding unicast data and multicast data. TNR 801 may also be adapted to run in PIM SM and PIM DM modes at the same time. Because of the distributed processor arrangement and large number of ports both PIM modes may be simultaneously operated in a distributive fashion without switching from one to another.

Figure 11:
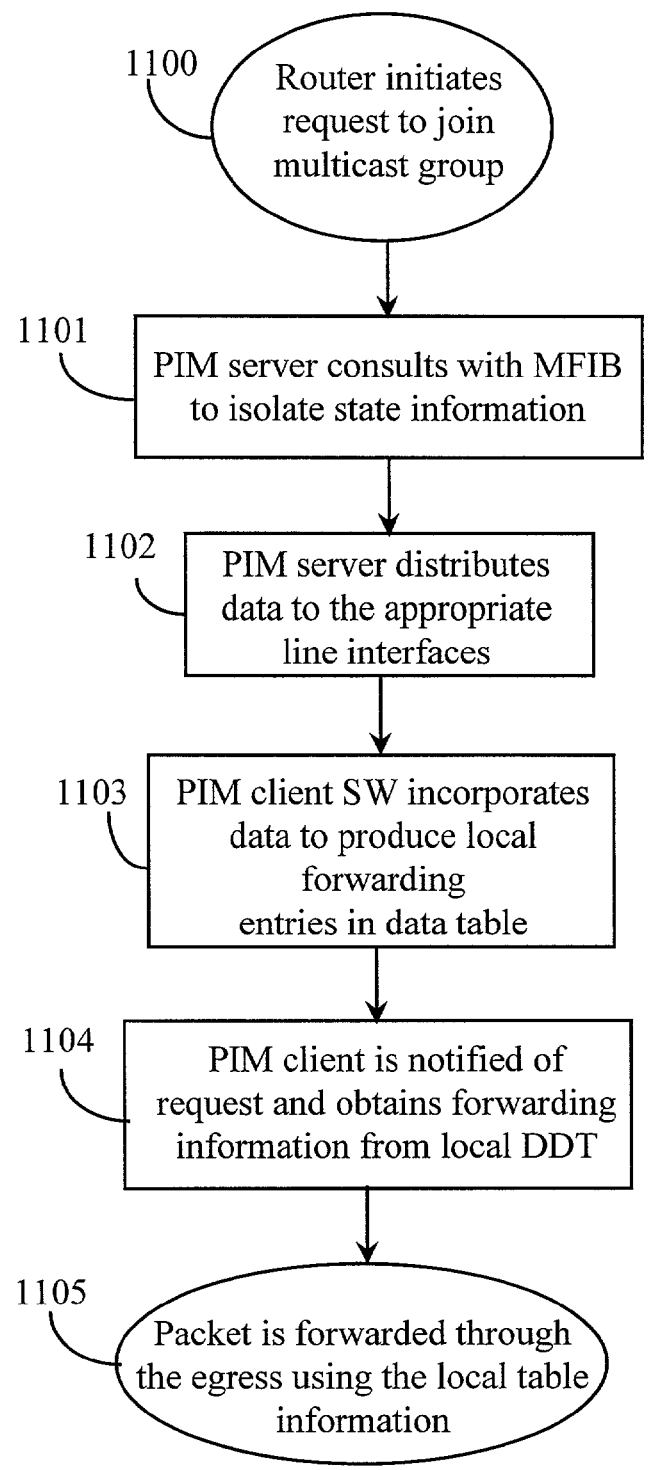
FIG. 11 is a process flow diagram illustrating steps for practicing PIM SM on a distributed processor router according to an embodiment of present invention.

FIG. 11 is a process flow diagram illustrating steps for practicing PIM SM on a distributed processor router according to an embodiment of the present invention. At step 1100 a router analogous to TNR 801 described with reference to FIGS. 8-10 initiates a request to subscribe to a particular multicast group. At this step the group or G information and source or S information is known. The request includes a network prefix address that may represent a plurality of physical ingress ports for receiving multicast data packets of the type associated with the request.

At step 1101 a PIM server software analogous to PIM server 815 described with reference to FIG. 10 above, consults with a multicast routing information base analogous to MFIB 902 of FIG. 10 to isolate a portion of the forwarding state information created for the particular (S,G) multicast data packets that are expected to arrive at the interface identified in the request to join of step 1100. At step 1102, the PIM sever then distributes the required data to the appropriate line interface or interfaces hosting the physical ports expected to receive the requested data.

At step 1103, a PIM client software analogous to PIM client 818 described with reference to FIG. 10 above incorporates the distributed data to produce a local forwarding entry in a distributed data table analogous to the DDT 903 described with reference to FIG. 10. In one embodiment, the distributed data table is created from primary building blocks distributed by the PIM server. In another embodiment, the table is already constructed before distributing to the PIM client.

At step 1104, the PIM client is notified of a first data packet of the requested (S, G), and obtains the forwarding information from the local DDT. At step 1105, the packet is forwarded through to egress using the distributed table information.

It will be apparent to one skill in the art that there may be many sub-steps included in this exemplary process without departing for the spirit and scope the present invention. For example, a subroutine can be included that handles the event of an unexpected multicast packet arriving at a PIM SM operational interface (LC).

Figure 12:
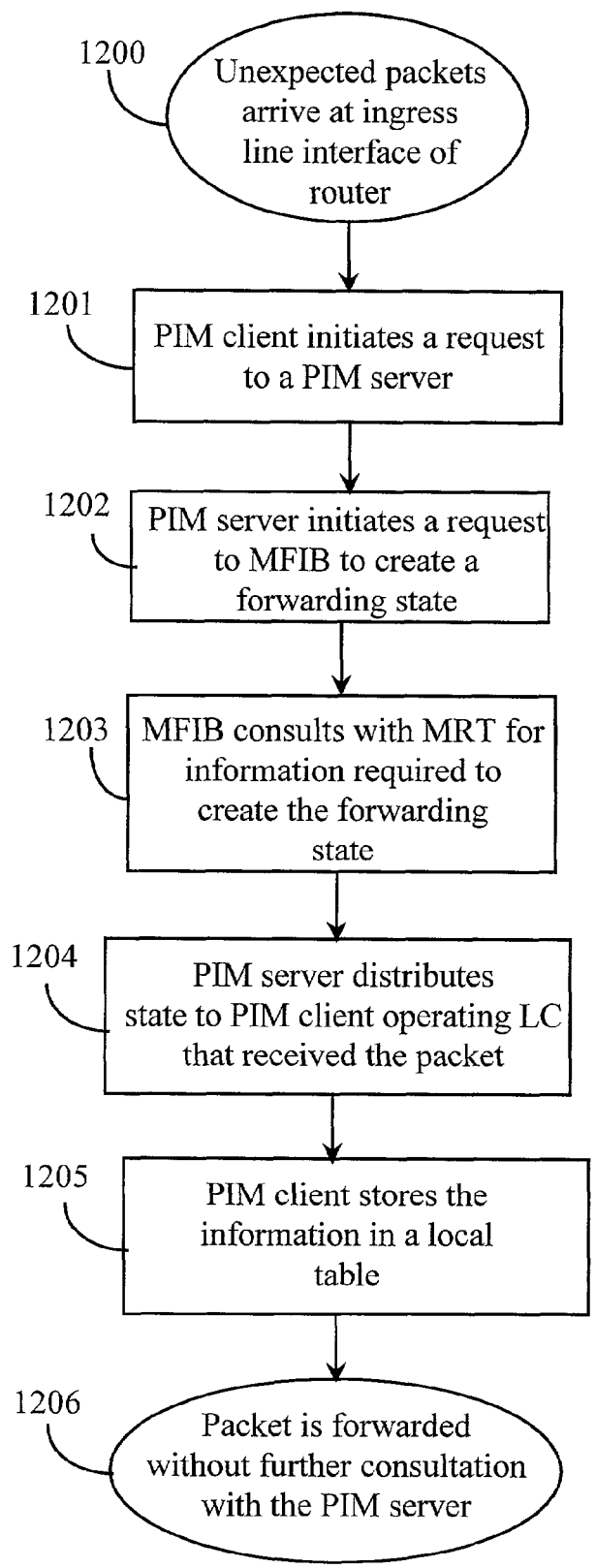
FIG. 12 is a process flow diagram illustrating steps of practicing PIM DM on an extruded processor router according to an embodiment of present invention.

FIG. 12 is a process flow diagram illustrating steps of practicing PIM DM on a distributed processor router according to an embodiment of the present invention. At step 1200 unexpected multicast packets arrive at ingress line interfaces of a router analogous to TNR 801 described with reference to FIGS. 8-10. At step 1201, a PIM client operating on a line interface receiving unexpected multicast data initiates a request to a PIM server, the request including the source and group information of the first unexpected packet to arrive. At step 1202 the PIM server initiates a request to the multicast forwarding information base to create a forwarding state particular to the packet information that initiated the request. At step 1203 the multicast forwarding information base consults with the management routing table for the information required to create the forwarding state.

At step 1204, the PIM server distributes the created state to the PIM client operating on the target line interface (LC) that received the packet. At step 1205 the PIM client stores the information in a local table analogous to DDT 903 of FIG. 10. At step 1206, the packet triggering the forwarding state creation and distribution is forwarded using information and all subsequent packets of the same (S, G) arriving at the same interface or forwarded using the same locally stored information without further consultation with the PIM server.

The above process steps are repeated for each differing multicast packet flow arriving at the router. That is to say that forwarding state information is created as first packets arrive so subsequent packets of the same flows can be routed using the locally stored DDT information.

The method and apparatus of the present invention may be practiced on all distributed processor routers connected to an Internet network or any other data-packet-network supporting PIM and or other similar multicast-forwarding protocols. The method and apparatus of the present invention also supports such conventions as automated-protection-switching (APS) and multi-protocol-label-switching (MPLS).

There are many alternative embodiments that fall within the spirit and scope of the invention as well, and the scope of the invention is limited only by the claims, which follow.

What is claimed is:

1. A software application stored in and executing from memory of a multi-processor data router in which a forwarding information base for the router is maintained, comprising:
   a server module; and
   one or more client modules, each client module including a plurality of physical communication ports of the data router; each port having an individual address;
   characterized in that the software sends a request to an external router to join a group, identifying the addresses of a portion less than a total number of the ports included at the client modules, the ports designated to receive packets from the external router and the server module sends to the client module only that portion of the forwarding information base incorporating only those ports that are utilized for the forwarding of the packets prior to receiving any packets from the external router, and the client modules utilize portions of the forwarding information base when processing data packets from the external router through the identified ports, the portions locally stored in a single data table, wherein individual ones of the ports access their assigned forwarding instructions from the local table only when needed.

2. The software application of claim 1 having one server module and multiple client modules.

3. The software application of claim 1 wherein the multi-processor data router follows protocol independent multicast (PIM).

4. The software application of claim 1 wherein an assigned number of physical ports on a line processor share a single block of forwarding information.

5. The software application of claim 1 wherein portions of the forwarding information base are periodically updated at their client modules by the server module.

6. The software application of claim 1 wherein the router is connected to and operates on the Internet network.

7. The software application of claim 1 further including a mechanism for asserting a drop state for unexpected multicast data packets arriving at any physical ports of an enabled line processor.

8. The software application of claim 1 further including a mechanism for creating forwarding state for unexpected multicast packets arriving at any of the physical ports of an enabled line processor.

9. The software application of claim 1 operating in protocol-independent multicasting dense mode (PIM-DM), wherein, each time an unexpected multicast packet is received at a communication port included on a client module, the client module communicates information about the packet to the server module, which identifies a portion of the forwarding information base specific to the packet, and then forwards that portion of the forwarding information base to the client module.

10. A method for processing multicast data packets in a multiple-processor data router comprising steps of:
   (a) sending a request to an upstream router to join a multicast group, the request including identification of a single physical ingress port from a plurality of available ports for receiving the requested multicast data packets;
   (b) isolating a portion of a multicast forwarding information base (MFIB) the portion including only forwarding information incorporating the identified physical ingress port and distributing only the isolated portion to a client software module hosting the physical ingress port expecting to receive the multicast data packets prior to receiving any of the requested multicast data packets;
   (c) receiving the requested multicast data packets at the identified ingress port; and
   (d) using only the distributed portion of the information base to route the received multicast data packets;
   wherein in steps (b) and (d), the portion of the information base is stored locally at the client module in a single table and individual ones of the client module ports access the forwarding information from the local table only when needed.

11. The method of claim 10 wherein in step (b) the portion of the multicast forwarding information base includes one or more of network layer address information, circuit ID metrics, and physical port metrics.

12. The method of claim 10 wherein in step (b) the multicast forwarding information follows protocol independent multicast (PIM).

13. The method of claim 12 wherein in step (b) distribution is from a PIM server to one or more PIM clients.

14. A multicast-enabled data router, comprising:
   a plurality of processors, individual ones operating as clients including specific ones of multiple physical communication ports, and one functioning as a control processor having access to a forwarding information base; and
   a software application comprising a server module executing on the control processor, and one or more client modules executing on individual ones of the processors including the specific communication ports each specific port having an individual address;
   characterized in that the data router sends a request to a neighboring router to join a group, retrieving group and source information, the request identifying the addresses of a portion less than a total number of ports included in the client module, the specific ports designated to receive packets from the neighboring router; and
   the server module prepares and sends to each client module, prior to receiving any packets from the neighboring router, only that portion of the forwarding information base including only those ports utilized for forwarding of packets having the group and source information expected to be received at the specified communication ports included in the client modules as a result of joining the group, wherein the information base portion is stored locally at the client module in a single table and individual ones of the client module ports access the forwarding information from the local table only when needed.

15. The data router of claim 14 wherein the operating protocol followed is protocol independent multicast (PIM).

16. The data router of claim 14 wherein the portions of multicast forwarding information are periodically updated at their client modules by the server module.

17. The data router of claim 14 connected to and operating on the Internet network.

18. The data router of claim 14 further including a mechanism for asserting a drop state for unexpected multicast data packets arriving at any port.

19. The data router of claim 14 further including a mechanism for creating a forwarding state for unexpected multicast packets arriving at any physical ports included in a client module.

20. The data router of claim 14 operating in protocol-independent multicasting sparse mode (PIM-SM).

21. The data router of claim 14 operating in protocol-independent multicasting dense mode (PIM-DM), wherein, each time an unexpected multicast packet is received at a communication port associated with a client module, the client module communicates information about the packet to the server module, which identifies a portion of the forwarding information base specific to the packet, and then forwards only that portion of the forwarding information base to the client module.

22. A method for processing multicast packets, comprising the steps of:
   (a) sending a request, by a server module executing on a control processor, to a neighboring router to join a group, retrieving group and source information identifying an address of an individual physical communication port from a plurality of available ports at a client module executing on a processor designated to receive packets from the neighboring router;
   (b) preparing and sending, by the server module to the client module, the client module including the individual physical communication port, only a portion of a forwarding information base incorporating the address of the identified communication port expected to receive packets as a result of joining the group, the forwarding information base being sent, prior to receiving any packets from the neighboring router; and
   (c) using, by the client module, only the portion of the forwarding information base sent by the server module to route the packets received at the communication port without requesting information from the original forwarding information base;
   wherein in steps (b) and (c), the portion of the information base is stored locally at the client module in a single table and individual ones of the client module ports access the forwarding information from the local table only when needed.

23. The method of claim 22 having one server module and multiple client modules.

24. The method of claim 22 wherein the operating protocol followed is protocol independent multicast (PIM).

25. The method of claim 22 wherein the portions of multicast forwarding information are periodically updated at their client modules by the server module.

26. The method of claim 22 wherein the method is performed in a router connected to and operating on the Internet network.

27. The method of claim 22 further including a mechanism for asserting a drop state for unexpected multicast data packets arriving at any enabled port.

28. The method of claim 22 further including a mechanism for creating forwarding state for unexpected multicast packets arriving at any of the physical ports of an enabled line processor.

29. The method of claim 22 operating in protocol-independent multicasting sparse mode (PIM-SM).

30. The method of claim 22 operating in protocol-independent multicasting dense mode (PIM-DM), wherein, each time an unexpected multicast packet is received at a communication port included in a client module, the client module communicates information about the packet to the server module, which identifies a portion of the forwarding information base specific to the packet, and then forwards only that portion of the forwarding information base to the client module.

* * * * *